March 21, 1950
E. BYLUND
2,500,978
ELECTRIC MOTOR BEARING
Filed Sept. 13, 1943
2 Sheets-Sheet 1
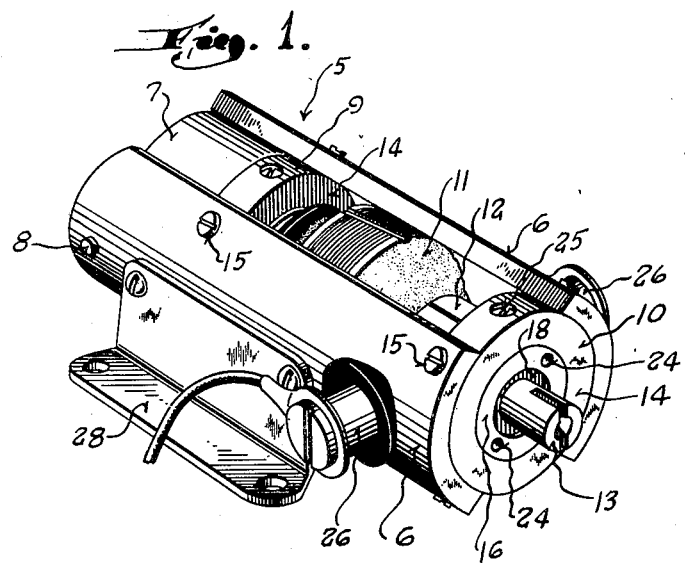
Fig. 1.
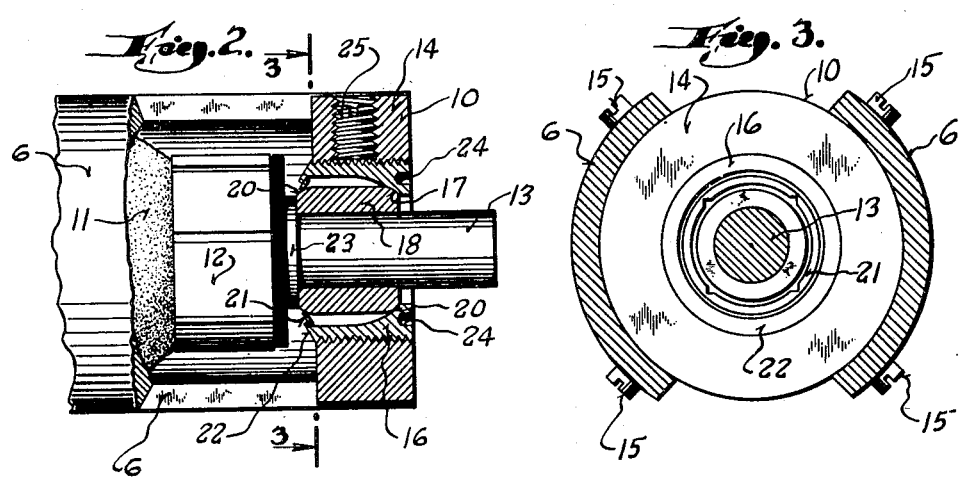
Fig. 2.
Fig. 3.
Inventor
Eric Bylund
By
Attorney March 21, 1950          E. BYLUND          2,500,978

ELECTRIC MOTOR BEARING

Filed Sept. 13, 1943          2 Sheets—Sheet 2

Inventor
Eric Bylund
By
Attorney

Patented Mar. 21, 1950

2,500,978

UNITED STATES PATENT OFFICE 2,500,978

ELECTRIC MOTOR BEARING

Eric Bylund, Genoa, Ill., assignor, by mesne assignments, to John Oster Manufacturing Company, Racine, Wis., a corporation of Wisconsin Application September 13, 1943, Serial No. 502,087

1 Claim. (Cl. 308—72)

This invention relates to electric motors, and more particularly to electric motors of the small portable type such as employed in electric hair clippers and the like.

One of the important objects of the invention resides in the provision of a self-aligning bearing unit which is easily accessible for adjustment. In the usual motors of this type the bearing units, after assembly, are often found to possess an improper amount of end play. Since no means is provided for facile adjustment, the motor after test must be taken apart so that spacing washers, shims, or the like can be inserted or withdrawn in an effort to adjust the difficulty. This is not only troublesome and time consuming but even after reassembly the adjustment may still not be accurate and must be repeated.

The present invention avoids this complicated procedure and makes it possible to accurately adjust the bearing unit to insure just the proper amount of end play. This is accomplished without the necessity of taking down the motor.

Another object of this invention is to provide a simple, easily constructed manner of embodying self-alignment in the adjustably mounted bearing unit.

Another important object of the invention resides in the provision of a small, sturdy electric motor, the design of which is characterized by simplicity and ease of assembly.

Another object of this invention resides in the provision of a novel frame construction for the motor wherein the permanent magnets constitute part of the frame and mount the bearing assemblies therebetween in a manner automatically assuring coaxiality between the armature and the magnets.

With the above and other objects in view, which will appear as the description proceeds, this invention resides in the novel construction, combination and arrangement of parts substantially as hereinafter described, and more particularly defined by the appended claim, it being understood that such changes in the precise embodiment of the hereindisclosed invention may be made as come within the scope of the claim.

The accompanying drawings illustrate one complete example of the physical embodiment of the invention constructed in accordance with the best mode so far devised for the practical application of the principles thereof, and in which:

Figure 1 is a perspective view of a motor constructed in accordance with this invention;

Figure 2 is an enlarged detail view partially in longitudinal section showing the bearing assembly;

Figure 3 is a cross sectional view taken on the plane of the line 3—3 of Figure 2;

Figure 4 is a top plan view of the motor; and

Figure 5 is an exploded perspective view of the motor to illustrate the simplicity of its assembly.

Referring now particularly to the accompanying drawings, the numeral 5 designates generally the frame of the motor and which consists of two identical magnet bars 6 embracing and clamped to a cylindrical block 7. A clamping screw 8 passing through one of the magnet bars and threaded into the other holds these parts in assembled relation, it being understood that the magnet bars are transversely curved to fit the cylindrical surface of the block 7 and that the bars are disposed diametrically opposite each other.

The block 7 with the magnet bars clamped thereto thus forms a U-shaped permanent magnet as well as the frame of the motor.

Bearing assemblies 9 and 10 are mounted between the permanent magnet bars to support the armature 11 in cooperative relation with the permanent magnets. The armature 11 is of conventional design having a commutator 12 and being mounted on a shaft 13 one end of which is received in the bearing assembly 9 while the opposite end thereof projects through the bearing assembly 10 to have driving connection with the mechanism to be driven.

The two bearing assemblies are identical. Hence the description of one will suffice for both. Each consists of an internally threaded ring 14 of nonmagnetic material and of a diameter equal to that of the cylindrical block 7 so as to fit snugly between the magnet bars where it is secured against displacement by screws 15. Threaded into the ring 14 is a bearing thimble 16 the bore of which is tapered to provide a shoulder 17 at its outer end. Within the bore of the thimble is a bearing member or bushing 18 which may be of the oil-less bearing type or any other suitable construction to directly receive the armature shaft.

The member or bushing 18 has its ends rounded as at 20 and is sufficiently smaller in diameter than the bore of the thimble to permit the bushing to rock on the shoulder 17.

The mouth of the bore at the inner end of the thimble through which the bushing is inserted during assembly has a spring ring 21 held therein by having the edge of the thimble bore peened or spun over as at 22. The inner periphery of this spring ring bears against the adjacent rounded end of the bushing 18 to hold the same in place without restricting rocking of the bushing in the thimble. This provides an exceptionally simple and compact self-aligning bearing assembly.

At the opposite ends of the armature structure the shaft is provided with shoulders 23 against which the bushings 18 of the bearing assemblies engage, and obviously it is necessary that the proper degree of end play be present between the shoulders and the adjacent bushings to insure a free running armature.

Heretofore the provision of proper end play, in small motors especially, has been a rather troublesome problem as it entailed practically dismantling the entire motor after tests showed either too great or insufficient end play. This was necessary to permit the insertion or removal of shims or washers.

The present invention overcomes this difficulty in an exceedingly simple manner by enabling the bearing thimble of at least one of the bearing assemblies to be screwed in or out to reduce or increase the end play as conditions require. For this purpose the thimbles have diametrically opposite spanner ring notches 24 in their outer ends. Thus through use of a proper spanner ring applied to the thimble of the bearing assembly 10 it is possible to effect the necessary adjustment of end play without in anywise disturbing the assembly of the motor, and when the adjustment has been effected screws 25 are tightened to lock the thimbles in position.

As noted hereinbefore the permanent magnet bars, together with the cylindrical block 7 to which they are clamped, constitute the entire frame for the motor. The magnet bars therefore have brush terminals 26 mounted thereon but insulated therefrom in line with the commutator 12 so that the brushes 27 carried thereby are held in proper relation with the commutator.

The magnet bars also have supporting brackets 28 fastened thereto to provide feet by which the motor is mounted in position for use. These supporting brackets, like the rings 14, are of non-magnetic material.

From the foregoing description, taken in connection with the accompanying drawings, it will be readily apparent to those skilled in the art, that this invention provides an electric motor the design of which is exceedingly simple and exceptionally well adapted to production methods of manufacture without sacrifice of accuracy and close fits. Attention is particularly directed to the fact that many of the parts are duplicates, as for instance, the magnet bars and all elements of the bearing assemblies; and that the novel bearing design employed provides self-aligning bearings and an exceedingly simple manner of adjusting the end play.

What I claim as my invention is:

An adjustable bearing assembly comprising: an outer bearing member adapted to be anchored to a support and having an aperture therein; an annular bearing thimble threaded into said aperture so as to be axially adjustable therein; a tapered shoulder in the bore of the thimble near one end thereof; an inner bearing member received in said bore and having a rounded end portion thereof seated on said tapered shoulder to permit the inner bearing member to rock on said shoulder, and whereby axial adjustment of the thimble in one direction is translated into axial adjustment of the inner bearing member with respect to a shaft received and rotatably supported within the inner bearing member; an inturned flange at the mouth of the thimble bore remote from said shoulder thereof; and an annular spring member interposed between said inturned flange and the adjacent end of the inner bearing member to hold the same in place within the thimble without restricting rocking of the inner bearing member on the thimble shoulder.

ERIC BYLUND.

REFERENCES CITED

The following references are of record in the file of this patent:

UNITED STATES PATENTS

| Number | Name | Date |
|---|---|---|
| 867,426 | Shields | Oct. 1, 1907 |
| 963,296 | Jungren | July 5, 1910 |
| 989,261 | Hjorth | Apr. 11, 1911 |
| 1,146,740 | Sorensen | July 13, 1915 |
| 1,267,210 | Gillaspy | May 21, 1918 |
| 1,336,196 | Chailliey | Apr. 6, 1920 |
| 1,379,349 | Leonard | May 24, 1921 |
| 1,444,751 | Mueller | Feb. 6, 1923 |
| 1,618,877 | Henry | Feb. 22, 1927 |
| 2,007,021 | Mikulasek | July 2, 1935 |
| 2,177,472 | Barrett | Oct. 24, 1939 |
| 2,181,418 | Cohen | Nov. 28, 1939 |

FOREIGN PATENTS

| Number | Country | Date |
|---|---|---|
| 336,214 | Great Britain | 1929 |